July 2, 1968  J. COOPER  3,390,519
TIMER ACCESSORY TRACK UNIT
Filed Oct. 3, 1967  2 Sheets-Sheet 1
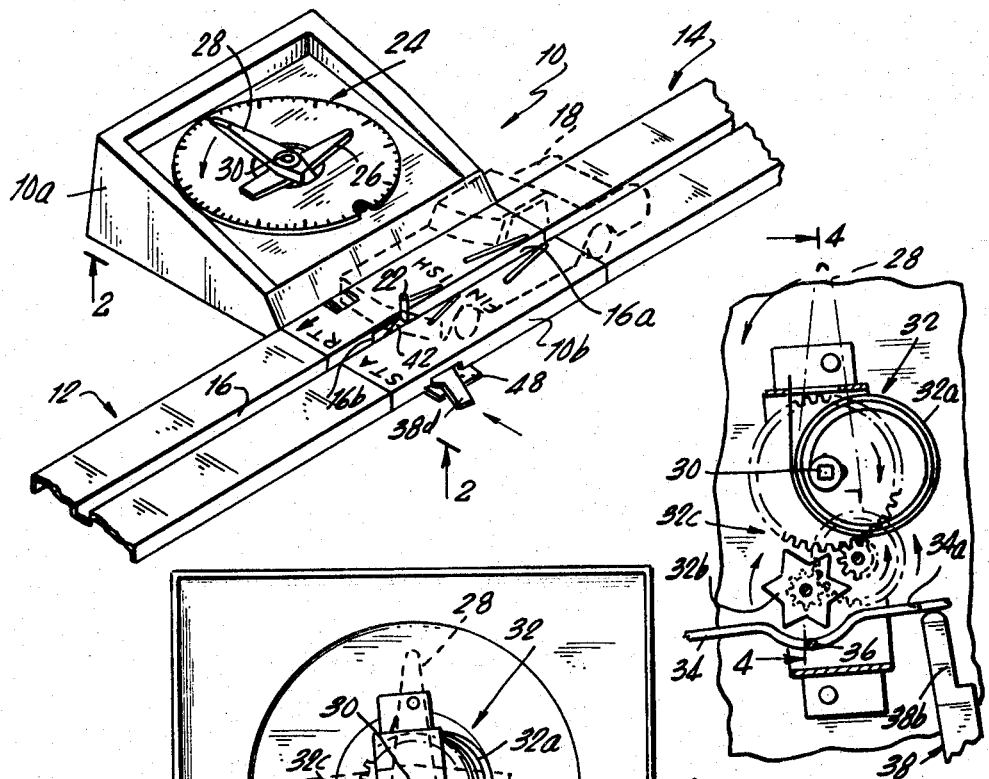
FIG. 1
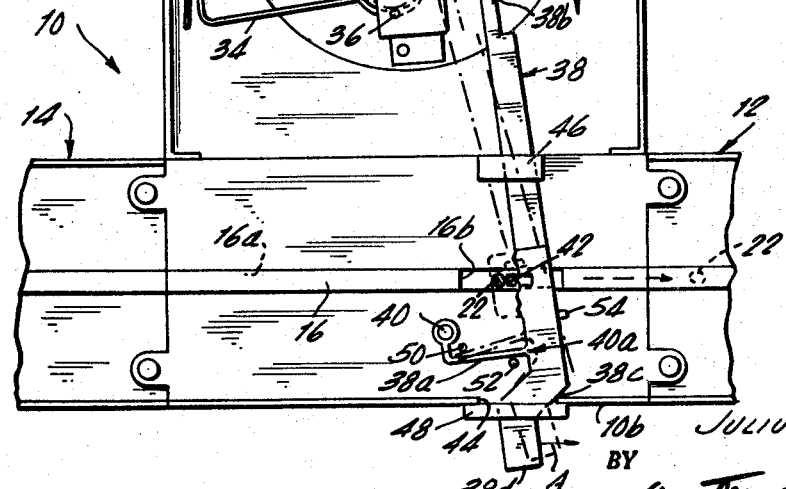
FIG. 2
FIG. 3
INVENTOR.
JULIUS COOPER
BY
Amster & Rothstein
ATTORNEYS July 2, 1968              J. COOPER              3,390,519
TIMER ACCESSORY TRACK UNIT
Filed Oct. 3, 1967
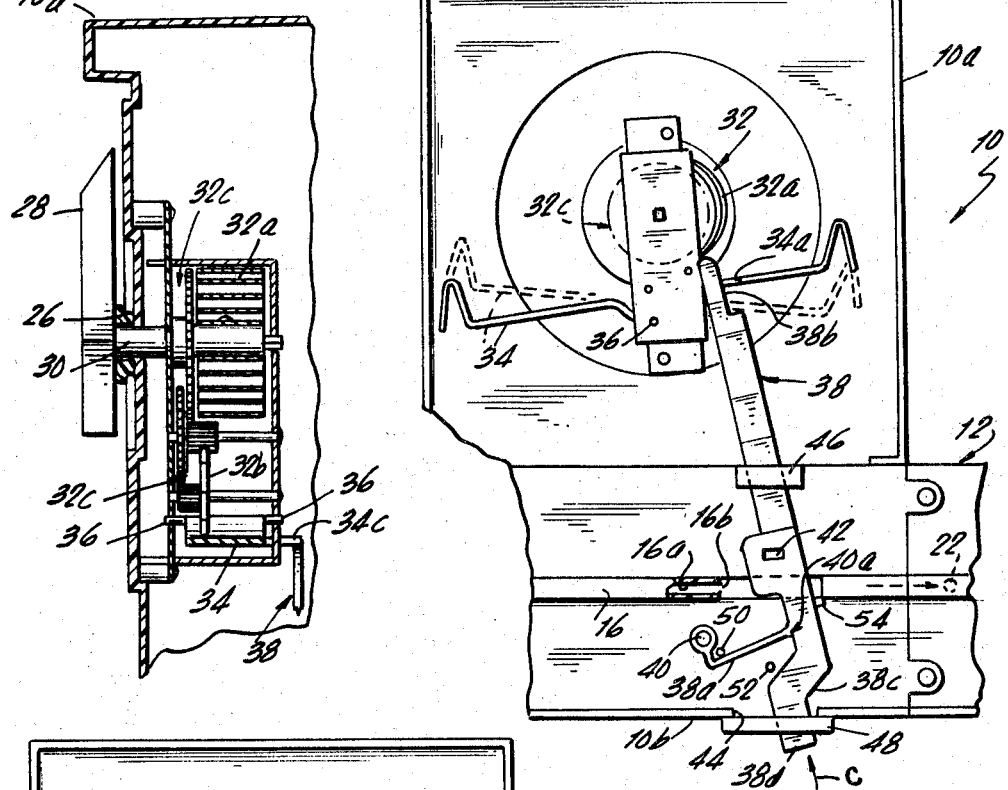
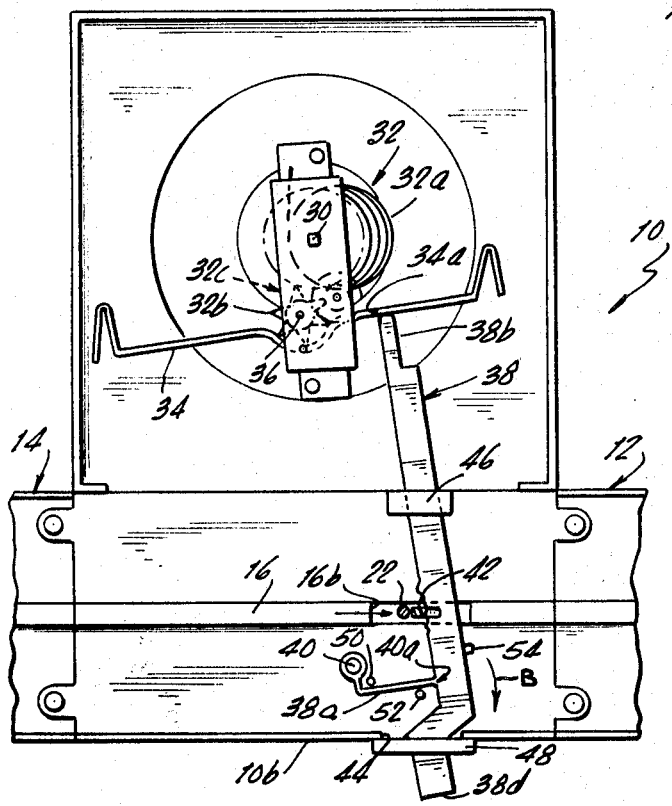
INVENTOR.
JULIUS COOPER
BY Amster & Rothstein
ATTORNEYS

United States Patent Office 3,390,519
Patented July 2, 1968

3,390,519
TIMER ACCESSORY TRACK UNIT
Julius Cooper, New Hyde Park, N.Y., assignor to Ideal Toy Corporation, Hollis, N.Y., a corporation of New York
Filed Oct. 3, 1967, Ser. No. 672,480
3 Claims. (Cl. 58—145)

ABSTRACT OF THE DISCLOSURE

An accessory track unit for use with an interconnected track having a closed main guide groove therein of the type used with one or more battery-operated vehicles having a depending guide which engages the guide groove to steer the vehicle about the track, wherein the accessory track unit has a clock mechanism for timing either one vehicle traverse about the track or a portion and/or several vehicle traverses. For timing a single vehicle traverse, operation of the clock mechanism is terminated by the vehicle itself.

---

The present invention relates generally to toy tracks for battery-operated vehicles, and more particularly to an accessory track unit having an integrated clock mechanism for timing vehicle movement on the track to thereby increase the play value of the product.

The track hereof is of the type comprised of interconnected units defining therealong a continuous main guide groove and used with battery-operated vehicles having guide pins extending into and engaging the guide groove to steer the vehicles along the track. This type track is a very important product because of its popularity. It does require, however, auxiliary or accessory units, otherwise the repetitious running of the vehicles along the track can become monotonous. Thus, there is a constant need for these accesory units, particularly such units that have an automatic mode of operation provided by the vehicles themselves, that are easily incorporated in the overall track system, and that are capable of being economically mass produced.

Broadly, it is an object of the present invention to provide an improved accessory track unit meeting the foregoing and other desirable commercial requirements and effectively increasing the play value of the track. Specifically, it is an object to provide a track unit which incorporates a clock mechanism for timing vehicle traverses about the track; the clock mechanism being started simultaneously with the release of a vehicle for movement about the track and, when set to time but a single traverse, being terminated by the vehicle itself when it completes this single traverse.

An accessory timer track unit demonstrating objects and advantages of the present invention includes a body having formed therein a continuation of the main guide groove, a clock mechanism, and an actuating member operatively connected to control operation of the clock mechanism and movable from an off-position into either one of two on-positions. In one of these on-positions the vehicle operating on the track is arranged to strike and thereby return the actuating member to its off-position thus enabling the automotive timing of a single vehicle traverse about the track. Manual movement, however, is required to return the actuating member to its off-position from the other on-position and this on-position is thus used when timing a portion or several vehicle traverses.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings wherein:

FIG. 1 is a perspective view of the timer accessory track unit hereof in its operative position connected to cooperating track units of a track for toy vehicles;

FIG. 2 is a bottom plan view of the accessory track unit, as seen in the direction of the arrows on line 2—2 in which the positions of movement of an actuating member thereof are illustrated in full line and phantom line perspective;

FIG. 3 is an enlarged partial plan view of the clock mechanism of the accessory track unit;

FIG. 4 is a partial elevational view, in section taken on line 4—4 of FIG. 3, illustrating further details of the clock mechanism;

FIG. 5 is a partial bottom plan view, similar to FIG. 2, but illustrating the actuating member in a different clearance position relative to the clock mechanism than such clearance position illustrated in phantom perspective in FIG. 2; and FIG. 6 is a bottom plan view, similar to FIG. 2, illustrating how the actuating member is actuated into its jamming position relative to the clock mechanism by the toy vehicle.

Reference is now made to the drawings, and in particular to FIG. 1, wherein there is shown an accessory timer track unit, generally designated 10, of the present invention. The track unit 10 is illustrated in an assembled condition with additional track units 12 and 14 connected fore and aft to it; all units (of which only units 10, 12 and 14 are shown for brevity's sake) cooperating to form a continuous track system having a closed guide groove 16. The length portion of the closed guide groove 16 formed in the body 10a of the track unit 10 is designated 16a. As generally understood, one or more battery-operated vehicles, such as the vehicle 18 (illustrated in phantom perspective so as not to obscure the structural features of the track 10) operates on the track and has a depending guide 22 mounted on its front end which engages with the guide groove 16, 16a to steer the vehicle about the track. The accessory timer track unit 10 hereof increases the play value of the track by serving as a device for timing traverses of the vehicle 18 about the track. It is desirable, in this connection, to be able to time a single traverse of the vehicle 18 and also any selected number of traverses. Thus, the track unit 10 includes a clock mechanism which, after being started, will automatically terminate after the vehicle 18 has made a single traverse about the track and also which can be terminated after any portion or number of traverses at the option of the user. As will become more apparent subsequently, the last named condition of the unit 10 also effectively eliminates it as a factor in the operation of the track which may, at times, be desirable.

As clearly shown in FIG. 1, an appropriate clock face 24 is delineated on an inclined front wall of the body 10a and cooperates with the usual two clock hands 26 and 28, the hand 26 being only manually movable and used as an aid in keeping count of the number of the vehicle traverses about the track. The other hand 28 is appropriately mounted on a shaft 30 which, as best shown in FIG. 2, is operatively connected to a spring-driven clock mechanism 32 mounted in a suitable compartment of the body 10a. The clock mechanism 32 may be any one of several commercially available types which is effective, during operation, to move the hand 28 about the clock face 24 and thereby time the vehicle traverses about the track.

As is generally understood, the clock mechanism 32 includes the usual drive spring 32a which is wound up by clockwise rotation of the clock hand 28 and when thereafter released is actuated by the spring 32a through counterclockwise movement about the clock face 24, the energy of the spring 32a being released in a well known controlled manner by a clock escapement member which, in illustrated embodiment, is a starwheel 32b. Briefly, rotative movement is imparted to the hand 28 through intermeshing gears, herein collectively designated 32c, which are operatively connected between the drive spring 32a and the shaft 30 via the escapement member 32b. Because the construction and mode of operation of the clock mechanism 32 hereof is so well known and, in any event, is not required for an understanding of the invention hereof, further details have been omitted for brevity's sake.

It is suffice to note that the mechanism 32 includes a generally horizontally oriented member 34 serving as a pendulum for the clock and pivotally mounted, as at 36, in an operative position relative to the rotating starwheel 32b such that during operation of the mechanism 32 the member 34 is actuated through oscillating movement by the starwheel 32b. Whenever the member 34 is prevented from oscillating, however, the operation of the clock mechanism 32 terminates.

Cooperating with the member 34 is an actuating member 38 mounted, as best shown in FIGS. 2, 5 and 6, on the underside of the track portion of the track unit 10. Actuating member 38 has a laterally extending arm 38a molded integral therewith which, at its free end, is mounted for pivotal movement on a depending pin 40. At the end of the actuating member 38 remote from the pin 40, the member includes a jamming finger 38b which, in a position of the member 38 from which it starts its pivotal traverse about the pin 40, abuts against the underside of the member 34. This starting jamming position of the jamming finger 38b thus prevents oscillating movement of the member 34 and is the off-position thereof. The actuating member 38, however, is movable from this starting jamming position into one of two prescribed on-positions or clearance positions with respect to the member 34, these positions being respectively illustrated in phantom perspective in FIG. 2 and in full line in FIG. 5. While there are important differences in these clearance positions which will subsequently be explained, in both cases the finger 38b is moved into a slot 34a machined in the member 34 and in this position does not interfere with the movement of the member 34 and thus permits operation of the mechanism 32.

Before describing the two clearance or on-positions, it should first be noted that the end of the actuating member 38 adjacent the pivot axis 40 is formed with an inclined edge providing a cam surface 38c and with an extending hand grip portion 38d. Further, the member 38, at a location thereon beneath the guide 16a within a cutout 16b thereof, has formed thereon an upstanding vehicle-blocking member 42. In the starting or jamming position of the member 38, the vehicle-blocking member 42 is located within guide groove 16a and thus prevents movement of the vehicle guide 22 through the guide groove.

To both free the vehicle 18 for movement and also to time but a single traverse of the vehicle about the track, the user merely manipulates the hand grip 38d of the actuating member 38 through a stroke A which is parallel to the vehicle movement and provides the first clearance position of FIG. 2. Specifically, during stroke A the cam surface 38c moves against one of the two edges bounding a cutout 44 in the depending side edge 10b of the track unit 10. This movement of the cam surface 38c along the cutout edge provides a first path of movement for the actuating member 38 which is characterized by pivotal movement about two different pivot points. First, the member 38 moves through a pivotal traverse about the pivot 40. Second, because of the inclination of the cam surface 38c, the member 38 also moves through a pivotal traverse about the juncture with it of the arm 38a, herein designated 40a. Since in accordance with the present invention the actuating member 38 is fabricated of resilient material, preferably as an injection molded plastic article of manufacture, the relative movement between the main portion of the member 38 and the arm 38a which occurs at the juncture 40a is only temporary and is reversed when the user releases the hand grip 38d. That is, after the stroke A the vehicle-blocking element 42 is cleared from the guide groove 16a thereby freeing the vehicle guide 22 but when the user subsequently releases the hand grip 38d there is slight clockwise rotation of the member 38 about the juncture 40a which is effective to return the vehicle-blocking element 42 partially back into the guide groove 16a. As a consequence, when the vehicle completes a single traverse about the track, the guide pin 22 thereon strikes the vehicle-blocking element 42 and thus forces the finger 38b back into its jamming position beneath member 34. This has the desired effect of stopping the clock mechanism 32 so as to indicate the time interval required for a single traverse of the vehicle. The return of the finger 38b to its jamming position can be best understood from FIG. 6 illustrating how, in response to the vehicle guide 22 striking the member 42, the actuating member 38 is actuated through clockwise rotational movement B about the pivot 40.

When the user desires to start the operation of the clock mechanism 32 and to terminate this operation manually, as for example when timing a portion or more than one traverse, this is readily achieved by merely manipulating the hand grip 38b through a stroke C which, as clearly shown in FIG. 5, is generally transverse to the direction of vehicle movement. In this instance, therefore, the cam surface 38c is not used but instead the user pushes directly in on the actuating member 38 causing a comparatively large pivotal traverse of this member about the pivot 40. As a consequence, the jamming finger 38b is actuated through counterclockwise pivotal movement projecting it into the cutout 44 which frees the member 34 for movement and thereby commences the operation of the clock mechanism 32. More important, this comparatively large pivotal traverse of the actuating member 38 results in movement of the vehicle-blocking member 42 to the second clearance position completely clear of guide groove 16a such that there is no possibility of the vehicle guide 22 striking this member and automatically terminating operation of the clock mechanism 32. To restore the jamming position of the finger 38b it is necessary for the user to actually pull out the hand grip 38d and thus manually move the member 38 through returning counterclockwise movement B.

To facilitate the movement of the actuating member 38 from its starting jamming position through its first and second paths of movement into its respective first and second clearance positions, the member 38 is appropriately extended through retaining members 46, 48 which hold it close to the underside of the track unit 10 while not restricting movement of the member 38. Additionally, depending stops 50 and 52 on the underside of the unit 10 are located on opposite sides of the arm 38a to limit the movement of the member 38. A laterally extending stop 54 located along an edge of the member 38 specifically limits the extent of stroke C.

What is claimed is:

1. In combination, a track comprised of interconnected track units defining therealong a continuous closed track guide groove for operating a battery-operated vehicle thereon, said vehicle being of the type having a depending guide adapted to engage with said track guide groove to steer said vehicle about said track, and an accessory timer track unit for timing the traverses of said vehicle about said track connected in said track comprising a body having formed therein a guide groove serving as a continuation of said track guide groove, a clock mechanism mounted on said body including an oscillating element movable through oscillating movement during the operation of said clock mechanism, an actuating member having a vehicle-blocking element thereon operatively arranged on said body to extend adjacent said clock mechanism and with said vehicle-blocking element thereof projected within said guide groove to releasably hold a vehicle against movement about said track, said actuating member being movable from a starting jamming position preventing movement of said clock mechanism oscillating element selectively through prescribed first and second paths of movement into first and second operative clearance positions relative to said oscillating element freeing said oscillating element for movement and permitting operation of said clock mechanism, said prescribed first path of movement of said actuating member being a pivotal traverse through an angular extent about a pivot axis spaced from said actuating member effective to move said actuating member substantially transversely of said guide groove to thereby clear said vehicle-blocking element entirely from said guide groove and to allow unimpeded traverses of a released vehicle about said track, said prescribed second path of movement of said actuating member being a pivotal traverse consisting partially of an angular extent also about said spaced pivot axis to thereby clear said vehicle holding element from said guide groove to release said vehicle for movement and partially of an angular extent against the urgency of a biasing means effective to subsequently bias said vehicle-blocking element through an angular extent back into an operative blocking position in said guide groove, whereby in said second clearance position of said actuating member said released vehicle is adapted to actuate said actuating member back into its said starting jamming position terminating the operation of said timer after a single traverse of said vehicle about the track.

2. An accessory timer track unit as defined in claim 1 wherein said actuating member includes a laterally extending arm operatively pivotally connected adjacent its free end to said pivot axis, said extending arm being oriented to serve as the radius for the angular traverse of the actuating member during said prescribed first path of movement thereof.

3. An accessory timer track unit as defined in claim 2 wherein said actuating member and the laterally extending arm therefrom are fabricated of resilient plastic and the pivot axis for said last named angular traverse of said actuating member during said prescribed second path of movement thereof is at the juncture of said actuating member and said laterally extending arm, whereby said angular traverse causes flexing in said laterally extending arm which produces a force biasing the vehicle holding element back into its blocking position within said guide groove.

References Cited
UNITED STATES PATENTS

| | | | |
|---|---|---|---|
| 2,510,241 | 6/1950 | Miller | 104—140 |
| 2,631,853 | 3/1953 | Haynes et al. | 273—86.2 |
| 2,978,863 | 4/1961 | Strobel | 246—182 |

RICHARD B. WILKINSON, *Primary Examiner.*

EDITH C. SIMMONS, *Assistant Examiner.*